United States Patent [19]

Matsumoto

[11] Patent Number: 5,163,651
[45] Date of Patent: Nov. 17, 1992

[54] MOVABLE TABLE
[75] Inventor: Hiroshi Matsumoto, Iwata, Japan
[73] Assignee: NTN Corporation, Osaka, Japan
[21] Appl. No.: 667,893
[22] Filed: Mar. 12, 1991
[30] Foreign Application Priority Data Mar. 13, 1990 [JP] Japan .................. 2-25594[U]
May 17, 1990 [JP] Japan .................. 2-51702[U]

[51] Int. Cl.⁵ ............................................ F16M 13/00
[52] U.S. Cl. ...................................... 248/425; 108/20; 248/913
[58] Field of Search .............. 248/913, 425, 287, 178, 248/183, 349; 108/20, 22

[56] References Cited

U.S. PATENT DOCUMENTS

| | | | |
|---|---|---|---|
| 3,479,632 | 11/1969 | Galles | 248/349 X |
| 3,495,519 | 2/1970 | Alfsen et al. | 108/20 X |
| 3,517,624 | 6/1970 | Helms | 108/20 X |
| 3,615,068 | 10/1971 | Edelstein | 248/349 |
| 3,638,933 | 2/1972 | Burnette et al. | 108/20 X |
| 4,640,486 | 2/1987 | Neville | 248/425 |
| 4,854,532 | 8/1989 | Trovato | 248/178 |
| 5,029,791 | 7/1991 | Ceccon et al. | 248/913 X |
| 5,031,547 | 7/1991 | Hirose | 108/20 X |

Primary Examiner—Ramon O. Ramirez
Attorney, Agent, or Firm—Nikaido, Marmelstein, Murray & Oram

[57] ABSTRACT

A movable table has a movable platen, a flange member secured to the movable platen and a fixed platen sandwiched between the movable platen and the flange member. Thrust bearings are disposed between the fixed platen and the movable platen and between the fixed platen and the flange member. Drive units are coupled to the movable platen to move the movable platen along the thrust bearings. Instead of supporting the movable platen on the thrust bearings, it may be supported in a non-contact manner by blowing compressed air into clearances defined between the fixed platen and the movable platen and between the fixed platen and the flange member.

4 Claims, 5 Drawing Sheets

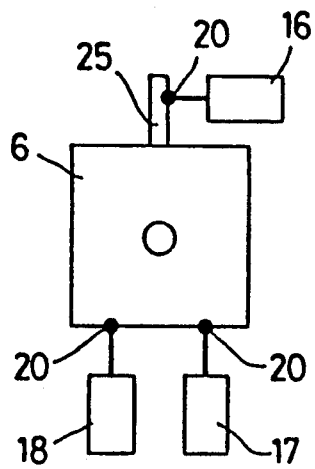
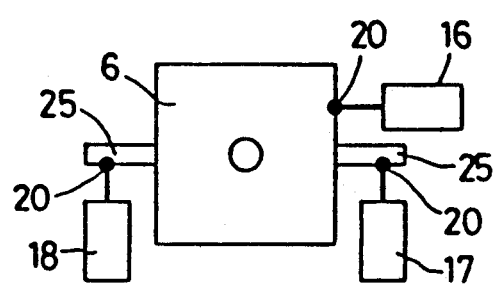
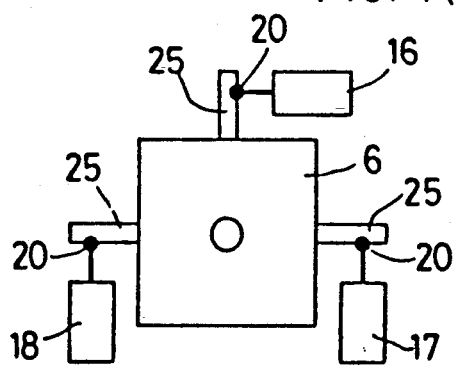
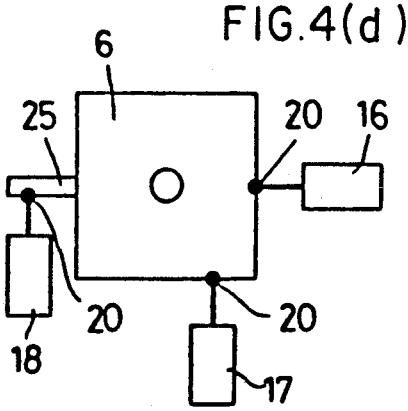
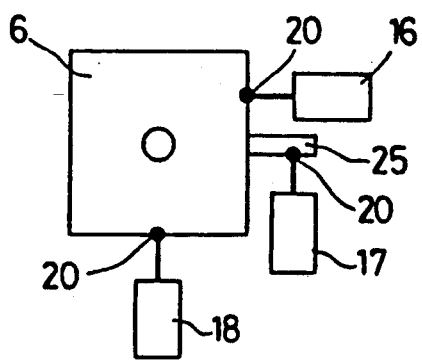

MOVABLE TABLE

This invention relates to a movable table capable of not only moving in a straight line in two directions perpendicular to each other in one plane but also making a pivotal motion.

A screen printer, a device for exposing a tape to light, an IC mounting device, a device for assembling liquid crystals and the like require a movable table as a work table capable of moving in two directions perpendicular to each other and pivotable by any angle so that fine alignment adjustment can be made.

But since a prior art movable table has two tables put one upon the other, in order to add a function of pivotal movement, it is necessary to mount these two tables on a rotary table having an indexing function. This will increase the height of the table and thus the entire size of the assembly.

A table proposed in Japanese Unexamined Patent Publication No. 61-120212 shows a solution to this problem. This table has a base platen and a movable platen supported on the base platen in a non-contact manner by a plurality of air cylinders so as to be movable in two directions and pivotable. In this arrangement, since the table consists of two layers, i.e. the base platen and the movable platen, the height of the table can be reduced.

But in the structure in which the movable platen is supported in a non-contact manner over the top surface of base platen, the supporting rigidity tends to be lower at a portion far away from the support surface. Thus, the movable platen tends to be inclined. Namely, during machining operation, if a machining load acts on a point far apart outwardly from the support surface, a vertical moment about the support surface will act on the loading point. This may cause the movable platen to incline.

Further, when assembling precision parts such as integrated circuits on the table, the table has to be moved accurately to a predetermined position and has to be stably fixed in this position. But in the above-described structure, since the movable platen, which is supported in a non-contact manner, has no means for restricting it from swaying and rocking, it is impossible to set the movable platen accurately in a predetermined position after moving it and to fix it stably.

It is a first object of this invention to provide a movable table which is free of swaying and rocking, which is prevented from inclining under load and which can be used stably.

A second object is to provide a movable table which can be reliably fixed in position and which has an improved supporting rigidity.

According to the present invention, the fixed platen is sandwiched between the movable platen and the flange member through the thrust bearing to restrict the vertical movement of the movable platen by the flange member. Thus, the movable platen is prevented from floating even if it is subjected to eccentric load and the supporting rigidity improves greatly.

Also, since the movable table has thrust bearings disposed between the fixed platen and the movable platen and between the fixed platen and the flange member, the height of the table can be reduced.

Further, by providing the movable platen with a plurality of drive units which extend and retract parallel to each other and another drive unit arranged at a right angle to the first-mentioned drive units, the movable table can be moved in a straight line in two directions perpendicular to each other and can make a pivoting motion.

Also, by producing a lifting force only at one of the top and bottom of the fixed platen, the movable platen is pressed against the fixed platen, so that the former can be firmly fixed to the latter. Thus, the supporting rigidity of the table improves greatly.

Other features and objects of the present invention will become apparent from the following description taken with reference to the accompanying drawings, in which:

FIGS. 4a–4e are schematic views showing connection arrangements between the drive units and the movable platen;

FIRST EMBODIMENT

Figure 1:
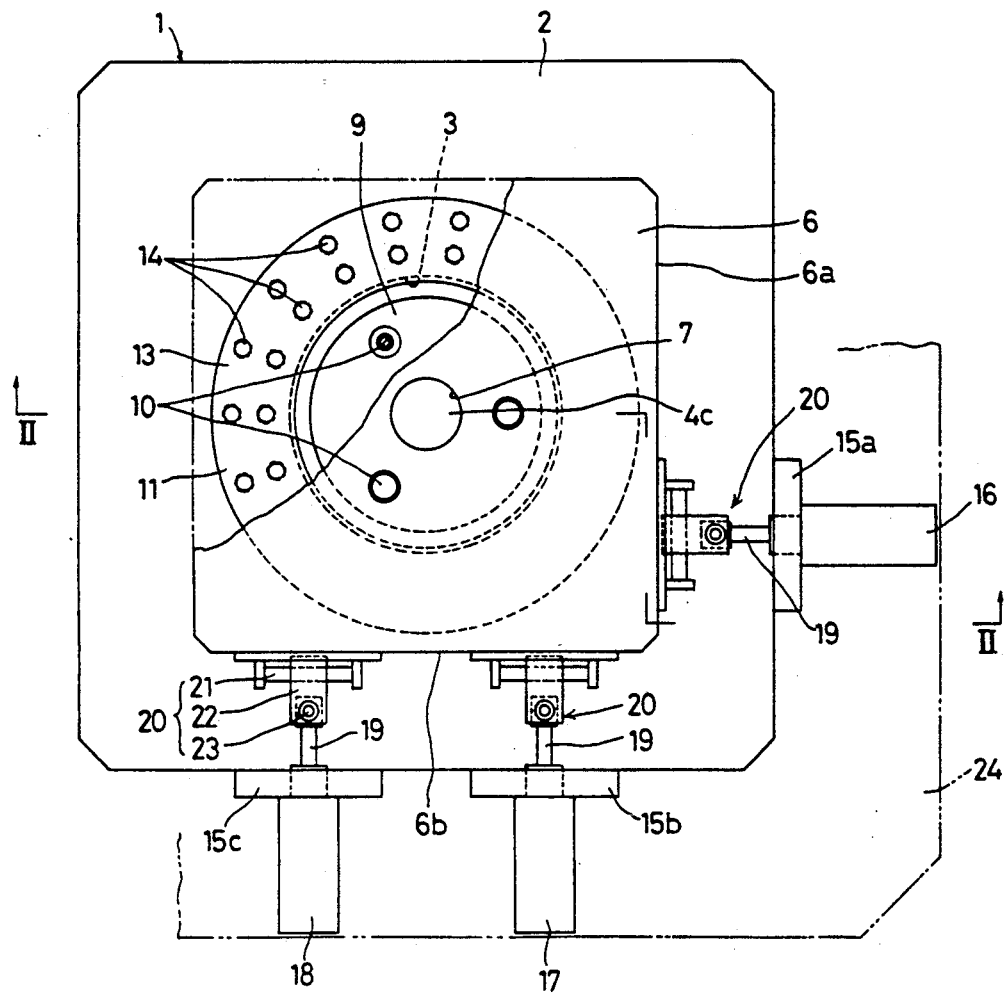
FIG. 1 is a partially cut-away plan view of the movable table of the first embodiment.
Figure 2:
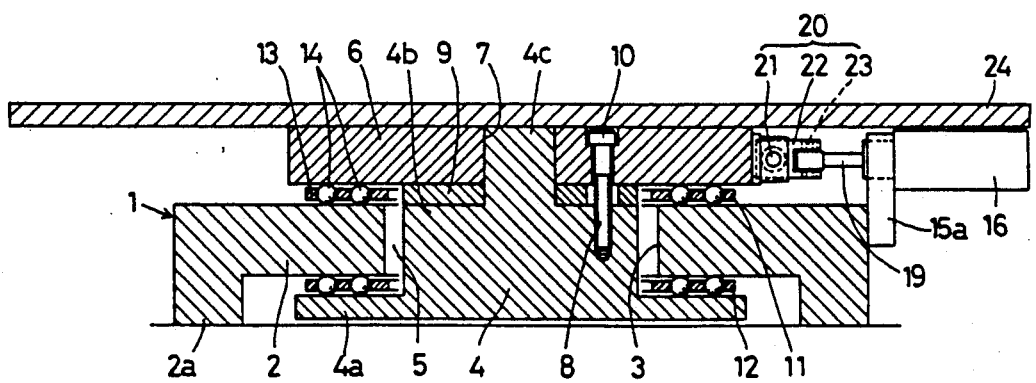
FIG. 2 is a sectional view taken along line II—II of FIG. 1.
Figure 3:
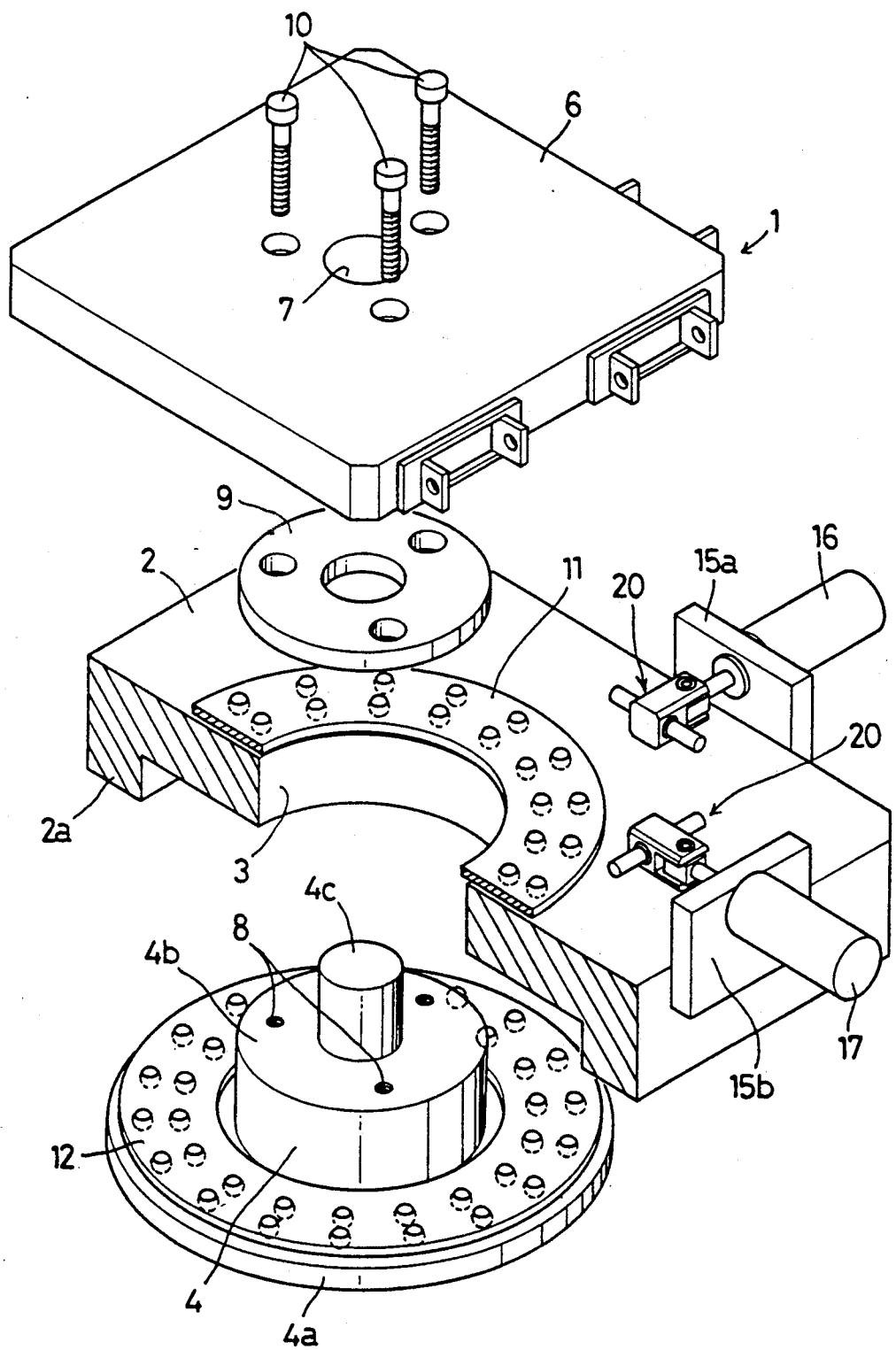
FIG. 3 is a partially cut-away perspective view of the same.

As shown in FIGS. 1-3, a fixed platen 2 is provided with a vertically disposed leg portion 2a and a horizontal rim, portion, which has a circular hole 3 formed in the center thereof into which a flange member 4 is movably inserted.

The flange member 4 is provided at the bottom end thereof with a flange portion 4a extending parallel to and disposed opposite to the bottom surface of the horizontal rim of fixed platen 2. Its cylindrical portion 4b inserted in the circular hole 3 has a diameter smaller than the internal diameter of the circular hole 3 so as to define a clearance 5 therebetween. Further the flange member 4 is provided on its top surface with a boss 4c and bolt holes 8. A movable platen 6 with a center hole 7 is mounted on the boss 4c. The movable platen 6 in engagement with the boss 4c is tightened against the top surface of the flange member 4 through a spacer plate 9 by means of bolts 10.

The movable platen 6 and the flange member 4 are assembled together with thrust bearings 11 and 12 mounted between the bottom surface of the movable platen 6 and the top surface of the horizontal rim of fixed platen 2 and between the bottom surface of the horizontal rim of fixed platen 2 and the flange portion 4a of the flange member 4, respectively.

The thrust bearings 11 and 12 comprise a ring-shaped cage 13 and a plurality of balls 14 rollingly fitted in the cage 13. The balls 14 serve to guide the movable platen 6 and the flange member 4 so as to be movable in every direction within the clearance 5 defined between the cylindrical portion 4b of the flange member 4 and the inner wall of the fixed platen 2. The thickness of the spacer plate 9 is determined so that a suitable pre-load will act on the thrust bearings 11 and 12 by tightening the bolts 10. Such pre-load serves to give a sufficient rigidity to the thrust bearings 11 and 12 enough not to lower the supporting accuracy even if the movable platen 6 is subjected to an eccentric load. Since the movable platen 6 and the flange member 4 are tightened together through the spacer plates 9, a suitable pre-load applied to the thrust bearings can be adjusted by changing the thickness of the spacer 9. Thus, the rigidity and accuracy of the table can be greatly improved.

An extensible drive unit 16 is mounted to one side of the fixed platen 2 through a support plate 15a. Two drive units 17 and 18 are mounted to a side intersecting the first-mentioned side at a right angle through support plates 15b and 15c, respectively, so as to be extended and retracted parallel to each other. The drive units 16, 17 and 18 have their respective shafts 19 connected to the sides 6a and 6b through joints 20.

Each joint 20 comprises a guide rod 21 fixed to and along the sides 6a or 6b, a slider 22 movably mounted on the guide rod 21 and a pivot pin 23 pivotally coupling the slider 22 with the shaft 19. The joint 20 serves to couple each of the shafts 19 of the drive units 16, 17 and 18 to each side of the movable platen 6 so as to be pivotable and slidable in a direction perpendicular to the direction in which each shaft 19 extends and shrinks.

The drive units 16, 17 and 18 may be in the form of ball threaded shaft assemblies as proposed in U.S. patent application 07/549,836 or other extensible drive means such as hydraulic cylinders.

In the movable table 1 of this embodiment, since the vertical movement of the movable platen 6 is guided by two thrust bearings 11 and 12 disposed at both sides of the fixed platen 2, even if a load acts on a point outwardly far apart from the surface supported by the balls 14, the movement of the movable platen 6 is restricted by the flange member 4 and the thrust bearing 12. This prevents the movable platen from lifting. Any work on the movable table 1 be carried out on a work table 24 mounted on the movable platen 6 as shown in FIG. 2.

In operating the movable table 1, when the drive unit 16 is actuated with the drive units 17 and 18 not actuated in FIG. 1, the sliders 22 coupled to the drive units 17 and 18 slide along the guide rods 21. Thus the movable platen 6 is moved in a straight line in one direction.

When the drive units 17 and 18 are activated by the same amount with the drive unit 16 not actuated, the movable platen 6 will move in a straight line in a direction perpendicular to the first-mentioned direction.

When the drive unit 18 is extended or retracted with the drive unit 17 not actuated and further the drive unit 16 positioned at a right angle to the drive unit 17 is extended or retracted, the movable platen 6 will pivot about the coupling point of the drive unit 17.

If the drive units 16, 17 and 18 are extended or retracted all at once, the movable platen 6 can be pivoted about any given point or can be moved in any direction on a rectangular coordinate.

In the above embodiment, three drive units 16, 17 and 18 are directly coupled to the sides of the movable platen 6. But the drive units and the movable platen may be coupled together in any other way as shown in FIGS. 4a–4e. In these figures, numeral 25 designates a coupling rod fixed to the movable platen 6. Each drive unit is pivotally and slidably coupled to the coupling rod 25 through the joint 20.

Instead of rolling bearings having balls as shown, static pressure bearings, slide bearings or a combination thereof may be used as the thrust bearings.

In the above embodiment, we showed a movable table capable of moving in two directions perpendicular to each other and making a pivoting motion. But this invention is also applicable to a movable table capable of moving only in one direction or to an X-Y table by changing the number and arrangement of the drive units used.

SECOND EMBODIMENT

Figure 5:
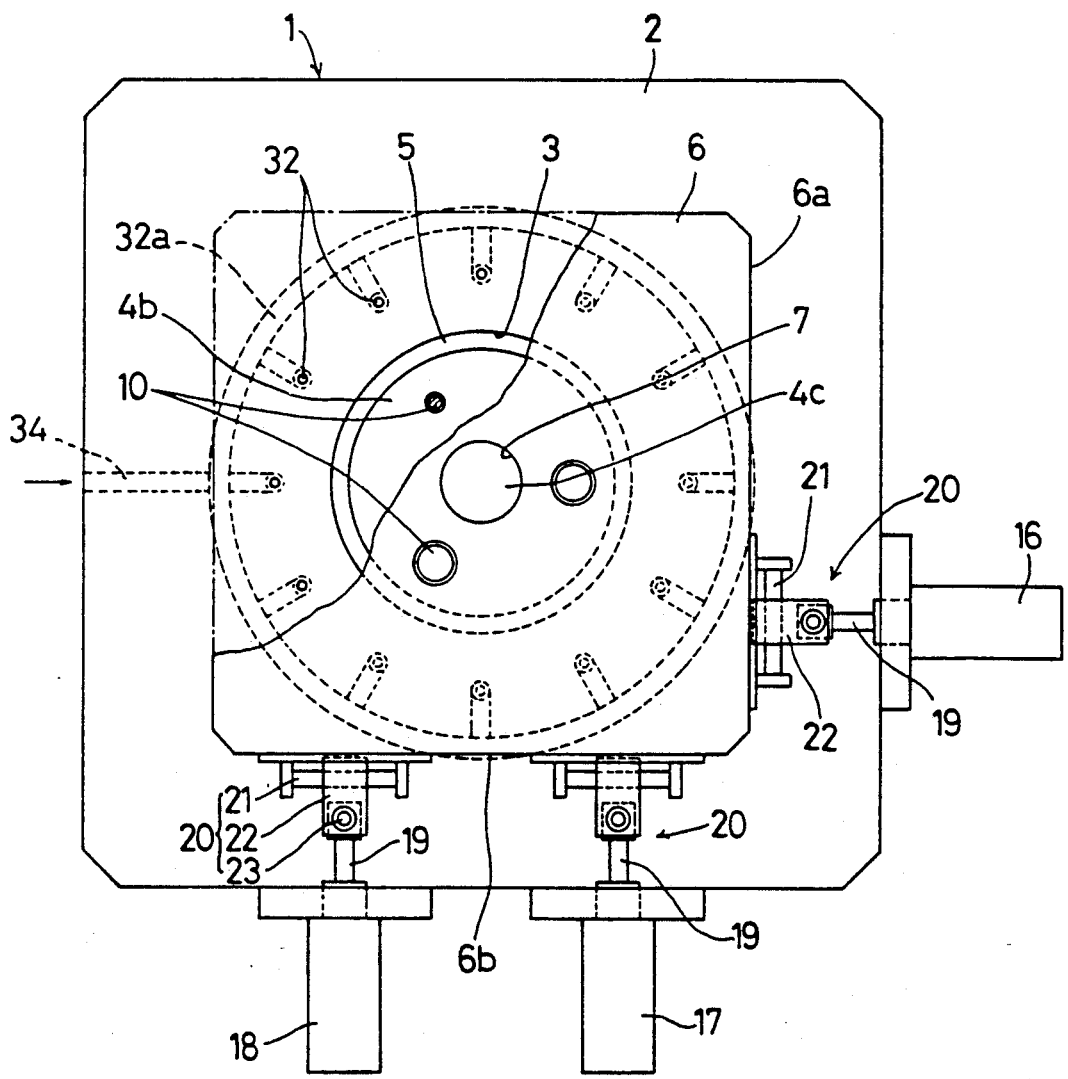
FIG. 5 is a plan view of the movable table of the second embodiment.
Figure 6:
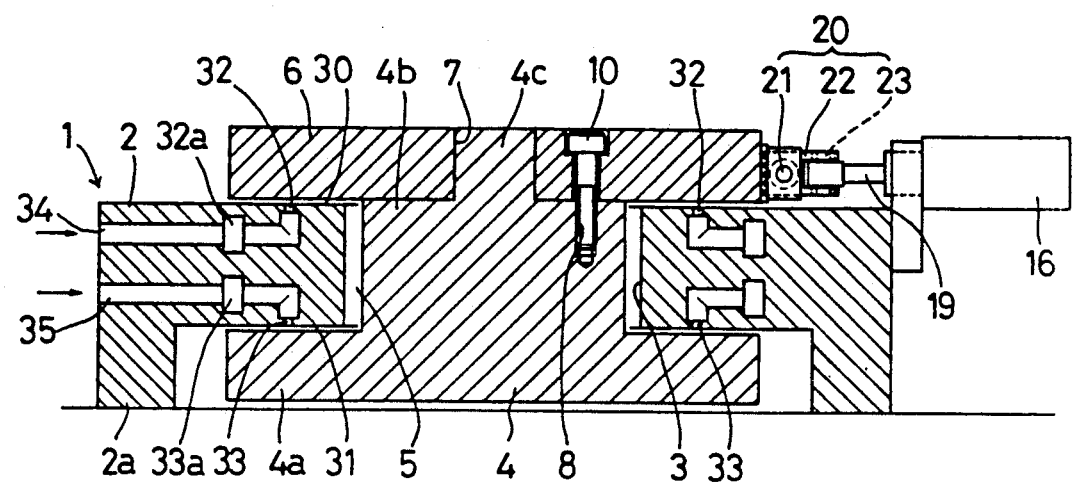
FIG. 6 is a vertical sectional front view of another embodiment.

As shown in FIGS. 5 and 6, a fixed platen 2 is provided on the bottom surface thereof with a leg portion 2a and is formed in the center thereof with a circular hole 3 through which a flange member 4 is movably inserted.

The flange member 4 is provided at its bottom end with a flange portion 4a extending parallel to and located opposite to the bottom surface of the fixed platen 2. It has a cylindrical portion 4b having a smaller diameter than the internal diameter of the circular hole 3 so as to define a clearance therebetween.

Further, the flange member 4 is formed on its top surface with a boss 4c and bolt holes 8. A movable platen 6 is brought into engagement with the boss 4c and tightened against the flange member 4 with bolts 10.

When the movable platen 6 and the flange member 4 are assembled together, thrust bearing clearances 30 and 31 are defined between the bottom surface of the movable platen 6 and the top surface of the fixed platen 2 and between the bottom surface of the fixed platen 2 and the flange portion 4a, respectively. A plurality of air supply nozzles 32 and 33 as sources of lifting force are provided in the top and bottom surfaces of the fixed platen 2, respectively, opposite to the clearances 30 and 31.

The nozzles 32 and 33 communicate with respective annular grooves 32a and 33a formed in the fixed platen 2 which in turn communicate through air passages 34 and 35 with compressed air sources (not shown) which operate independently of each other. By activating the air supply sources, compressed air is blown out through the nozzles 32 and 33 separately from each other into the thrust bearing clearances 30 and 31. Thus static pressure is produced in the clearances 30 and 31, keeping the movable platen 6 or the flange member 4 kept out of contact with the fixed platen 2.

In this embodiment, too, the drive units 16, 17 and 18 are mounted on the movable platen 6 as in the first embodiment, and are coupled through the joints 20 as in the first embodiment.

With the movable table of this embodiment, when compressed air is blown out of the air supply nozzles 32 and 33, the movable platen 6 and the flange member 4 will be supported in a non-contact manner. Thus, the movable platen 6 is guided so as to be movable in every direction within the clearance 5 defined between the cylindrical portion 4b of the flange member 4 and the fixed platen 2.

In this state, since the vertical movement of the movable platen 6 is restricted by the two static pressure air bearings provided at both sides of the fixed platen 2, the movable platen 6 is prevented from vibrating and rocking while moving. This makes it possible to move it to a predetermined position with high accuracy.

Further, even if a load acts on a point apart from the surface supported by the air supply nozzles 32 and 33, since the movement of the movable platen 6 is restricted by the flange member 4 and the static pressure air bearings, the movable platen 6 is prevented from unduly inclining.

If it is necessary to hold the movable platen 6 in a fixed position under a large load during machining, the blowing of air from the air supply nozzles 32 is stopped while keeping air blown out of the air supply nozzles 33 after the movable platen 6 has been moved to a desired position. Thus the movable platen 6 will be pushed down by the compressed air from the air supply nozzles 33, so that its bottom surface will be pressed hard against the top surface of the fixed platen 2. As a result, the movable platen 6 can be supported with high rigidity.

The operation of the movable table 1 of the second embodiment is the same as in the first embodiment. So the description is omitted.

Figure 7:
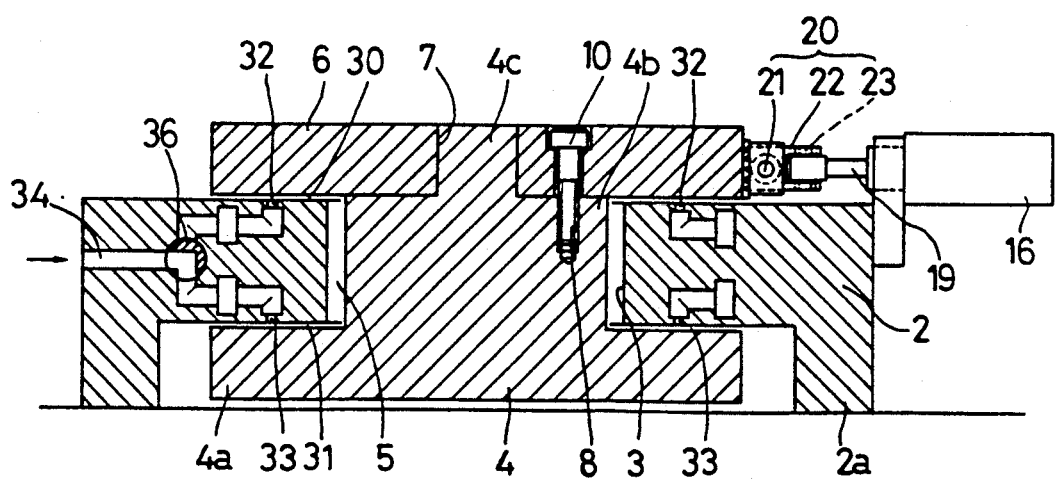

FIG. 7 shows another embodiment in which air supply nozzles 32 and 33 branch from a single air passage 34. Compressed air from the air passage 34 is selectively supplied to either one of the air supply nozzles 32 and 33 or to both of them by controlling a changeover valve 36 provided at the branch point.

In the second embodiment, we showed a structure in which the movable platen is supported in a non-contact manner by means of static pressure air bearings. But the movable platen or the flange member may be supported in a non-contact manner by use of a magnetic force by providing a magnetic force producing means such as electromagnets on the top and bottom surfaces of the fixed platen and providing permanent magnets on the opposite surfaces of the movable platen and the flange member.

The lifting force producing source may be provided on the movable platen or the flange member so as to oppose to the fixed platen.

What is claimed is:

1. A movable table, comprising:
   a movable platen,
   a flange member secured to a bottom of said movable platen,
   a fixed platen supporting said movable platen and said flange member, said fixed platen including a vertical leg portion, and a horizontal rim portion at a top of said leg portion, and extending inward therefrom, such that said horizontal rim portion is disposed between said movable platen and said flange member,
   thrust bearings disposed between said movable platen and said fixed platen and between said fixed platen and said flange member, and
   drive units coupled to said movable platen to move said movable platen along said thrust bearings.

2. A movable table as claimed in claim 1, wherein said drive units comprise at least two first drive units having their axes parallel to each other for moving said movable platen in one direction, at least one second drive units for moving said movable platen in a direction perpendicular to said one direction, and coupling means provided for coupling said first and second drive units with said movable platen, each of said coupling means comprising a slider pivotally mounted on the tip of said respective drive units and a guide rod secured to said movable platen, said guide rod being coupled to said slider so as to slidably and undetachably guide said slider.

3. A movable table, comprising:
   a movable platen,
   a flange member secured to the bottom of the movable platen,
   a fixed platen supporting said movable platen and said flange member,
   thrust bearings disposed between said movable platen and said fixed platen and between said fixed platen and said flange member, wherein said thrust bearings are static pressure air bearings and means for producing lifting force is provided on one of said fixed platen, movable platen and flange member, and
   drive units coupled to said movable platen to move said movable platen along said thrust bearings.

4. A movable table as claimed in claim 3, wherein said lifting force producing means are operable independently of each other.

* * * * *